April 10, 1928.
H. HAMBURGER
ATTACHMENT FOR BUMPERS
Filed Aug. 31, 1927
1,665,780
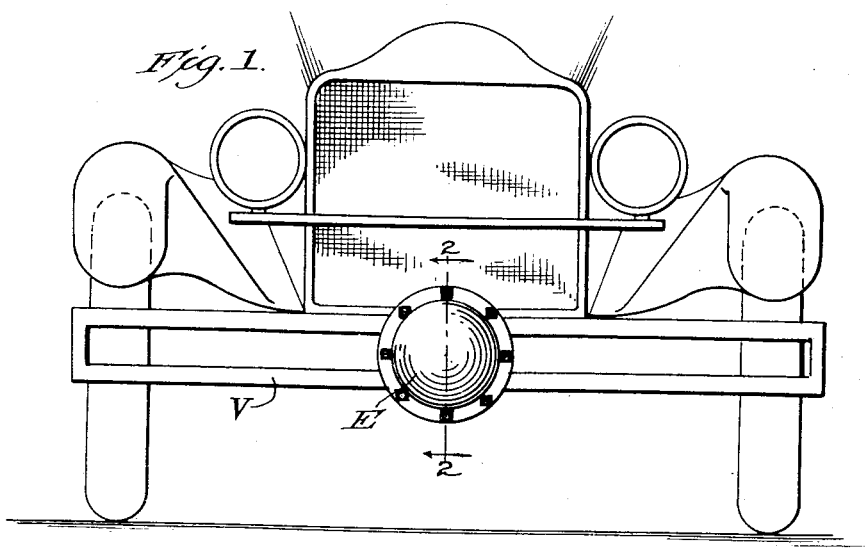
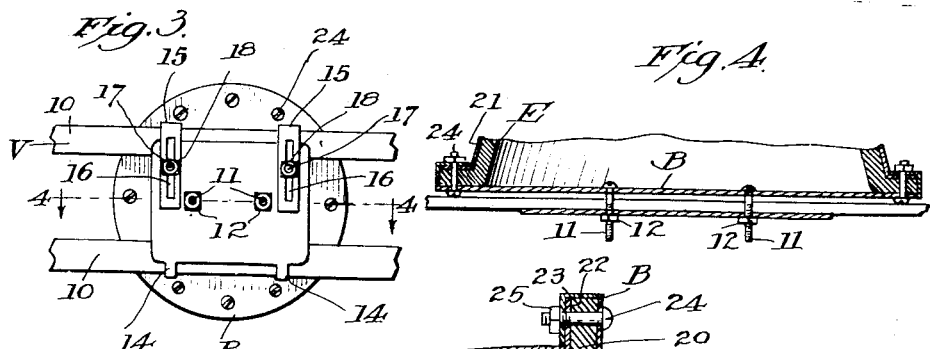
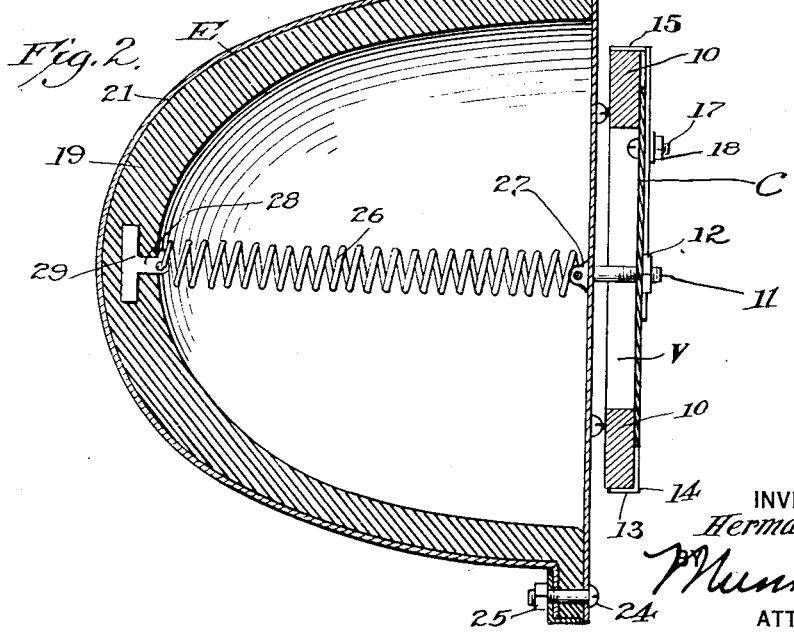
INVENTOR
*Herman Hamburger*,
*Munn & Co.*
ATTORNEY Patented Apr. 10, 1928.

1,665,780

UNITED STATES PATENT OFFICE.

HERMAN HAMBURGER, OF SANTA PAULA, CALIFORNIA.

ATTACHMENT FOR BUMPERS.

Application filed August 31, 1927. Serial No. 216,711.

My invention relates generally to vehicle bumpers, and it is a purpose of my invention to provide an attachment therefor, which, in its association with a bumper, operates, in the event of a collision to shield the bumper against direct contact with an obstacle such as the bumper of another vehicle, so as to prevent marring of the surface finish of the bumper, and to cushion the shock of the impact to the extent that the latter will be partly absorbed before being transmitted to the bumper, thus materially aiding the bumper in protecting the vehicle against damage.

I will describe only one form of attachment for bumpers embodying my invention and will then point out the novel features in claims.

In the accompanying drawing:

Fig. 1 is a view showing in front elevation one form of attachment for bumpers embodying my invention in position applied to the bumper of a motor vehicle;

Fig. 2 is an enlarged sectional view taken on the line 2—2 of Fig. 1;

Fig. 3 is a view illustrating the attachment in rear elevation and applied to the bumper; and Fig. 4 is a fragmentary enlarged sectional view taken on the line 4—4 of Fig. 3.

Referring specifically to the drawing in which similar reference characters designate similar parts in each of the several views, my invention in its present embodiment comprises a base B in the form of a circular metal plate which is adapted to be supported in a vertical position against the outer side of the bars 10 of a conventional form of vehicle bumper V, by means of a clamping member C in the form of a rectangular plate, the base and member having registering openings through which fastening members in the form of bolts 11 extend and are provided with nuts 12 for firmly clamping the plate and member on the bumper bars. The clamping member C is provided with a pair of angularly disposed lips 13 which are adapted to overlie and engage the lower side-edge of one of the bumper bars, while a pair of straps 14 are provided with angularly disposed lips 15 adapted to overlie and engage the upper side edge of the other bar, the straps having slots 16 through which extend fastening members in the form of bolts 17 having nuts 18 by means of which the straps are adapted to be firmly secured to the clamping member. The slots 16 permit adjustment of the straps towards or away from the clamping member so as to accommodate bumpers of different widths, while the lips 13 of the member and the lips 15 of the straps cooperate to prevent lateral displacement of the member and hence the base B from the bumper.

A cushioning element designated generally at E and preferably molded of resilient rubber is adapted to be secured to the outer side of the base B. The element in the present instance is in the form of a cup shaped body 19 of suitable diameter and thickness and is provided with an outwardly projecting marginal flange 20 of the same diameter as the base B. The body 19 is provided with a cover 21 formed of soft leather or other suitable tough and flexible material, having a marginal flange 22 overlying the flange 20. To enclose the outer face of the flange 20 as well as the peripheries of the flanges 20 and 22, I provide a metal ring 23 of L shaped cross section in which the flanges are freely received. Fastening members in the form of bolts 24 extend through registering openings formed at regularly spaced intervals circumferentially in the ring 23, flanges 20 and 22 and base B, and are provided with nuts 25 by means of which the flanges of the cushioning element E and its cover 21 are firmly clamped between the ring 23 and the base B.

A resilient member in the form of a coiled expansible spring 26 is disposed axially within the interior of the body 19 and is attached at its ends to a perforated ear 27 on the base B and a second perforated ear 28 formed on a headed stud 29 molded in the wall of the body, all of which is clearly shown in Fig. 2. The spring is normally under compression so as to urge the cupped portion of the element E away from the base B.

It will be clear that with the attachment associated with the bumper as above described, the cushioning element E will project in advance of the bumper so that in the event of a collision with an obstacle in front of the element such as for instance the bumper of another vehicle, the element and not the bumper will strike or be struck by the other vehicle's bumper, thus preventing metal to metal contact of the bumpers with the consequent marring of their surface finishes. The impact of the collision will be in part absorbed by the cushioning element as the body 19 will yield under the force of the impact and will compress the spring 26, thereby permitting the body to collapse. It will thus be clear that only a portion of the shock of the impact will be transmitted to the bumper so that my invention as well as preventing marring of the surface finish of the bumper, materially aids the bumper in preventing damage to the vehicle.

It will be manifest that two or more attachments embodying my invention could be applied to a bumper at various points along the length of the latter, and that the shape of the body 19 could be varied at will to suit the conditions under which the attachment is to be used.

Although I have herein shown and described only one form of attachment for bumpers embodying my invention, it is to be understood that various changes and modifications may be made therein without departing from the spirit of the invention and the spirit and scope of the appended claims.

I claim:

1. In combination, a vehicle bumper, a cushioning element comprising a hollow body of flexible material, means for securing the body to the bumper at a point in advance of the latter, so as to shield the bumper against direct contact with an obstacle, and means in the body adapted to yield in response to the striking of an obstacle by the body so as to allow the body to be collapsed whereby the force of the impact sustained by the body will be partly absorbed before being transmitted to the bumper.

2. In combination, a vehicle bumper, a cushioning element comprising a hollow cup shaped body formed of flexible material, means for securing the body to the bumper at a point in advance of the latter so as to shield the bumper against direct contact with an obstacle, and a coiled expansible spring supported in the body and adapted to yield in response to the striking of an obstacle by the body so as to allow the body to be collapsed, whereby the force of the impact will be partly absorbed before being transmitted to the bumper.

3. An attachment for bumpers comprising a hollow body of yieldable material, means by which the body is adapted to be supported on a bumper at a point in advance of the latter so as to shield the bumper against direct contact with an obstacle, and means in the body yieldable in response to the striking of an obstacle by the body to allow the body to collapse for the purpose described.

4. An attachment for bumpers comprising a hollow cup shaped body formed of rubber, means by which the body is adapted to be supported on a bumper at a point in advance of the latter so as to shield the bumper against direct contact with an obstacle and a coiled expansible spring in the body adapted to yield in response to the striking of the obstacle by the body so as to allow the latter to collapse under the force of the impact for the purpose described.

5. An attachment for bumpers comprising a base plate, a clamping member, fastening members extending through the plate and member by means of which the two are adapted to be rigidly clamped to opposite sides of a bumper bar, a hollow body of yieldable material on the base plate, means for securing said body to the base plate, and resilient means in the body correlated with the plate and body in a manner to yield in response to the striking of an obstacle by the body for the purpose described.

6. An attachment as embodied in claim 5 wherein said clamping member comprises a plate having lips adapted to overlie and engage one side edge of the bumper bar, straps having lips adapted to overlie and engage the other side edge of the bar, and means for adjustably and rigidly connecting the straps and plate so as to permit the two to be adjusted towards or away from each other to accommodate bumper bars of different widths.

7. An attachment for bumpers comprising a base plate, a clamping plate, fastening members extending through the plates by means of which a bumper bar is adapted to be clamped between the plates so as to support the base plate in a vertical position against one side of the bumper bar, said clamping plate having lips adapted to overlie and engage one side edge of the bumper bar, slotted straps having lips adapted to overlie and engage the other side edge of the bumper bar, fastening members extending through the clamping plate and slots of said straps to secure the straps to the plate, a cup shaped body of flexible material having an outwardly projecting marginal flange, a clamping ring, fastening members extending through said ring, flange and base plate for securing said body on the plate, and an expansible coil spring in the body engaging the base plate and inner wall of the latter.

8. An attachment as embodied in claim 7 wherein a cover of soft material encloses the body and is provided with a flange interposed between said ring and the flange of the body so as to clamp the cover on the body.

9. An attachment for bumpers comprising a hollow cup shaped body, and means by which the body is adapted to be supported on a bumper at a point in advance of the latter so as to shield the bumper against direct contact with an obstacle, the body being formed of yieldable material so as to be compressed when struck and thereby absorb the force of the impact.

HERMAN HAMBURGER.